May 5, 1970  MATAICHI TAJIMA  3,510,650
APPARATUS FOR PRODUCING COLORED RADIOGRAPHS
Filed Nov. 4, 1965
FIG. 1
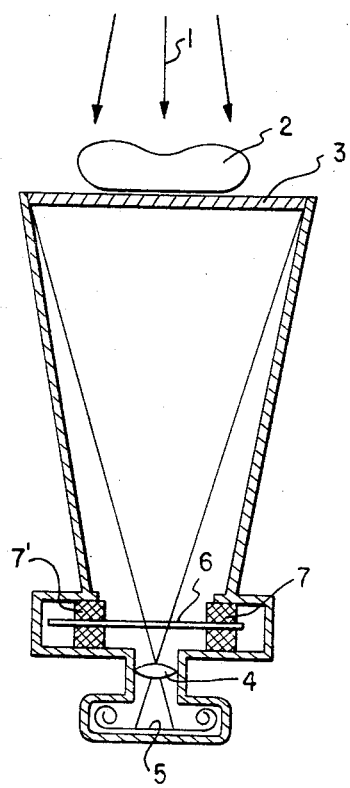
FIG. 2
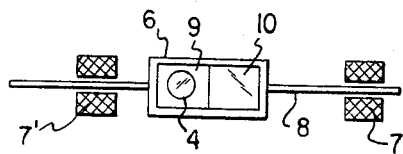
FIG. 3
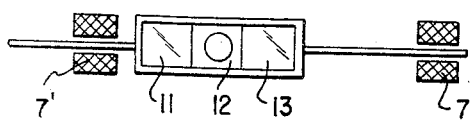
FIG. 4
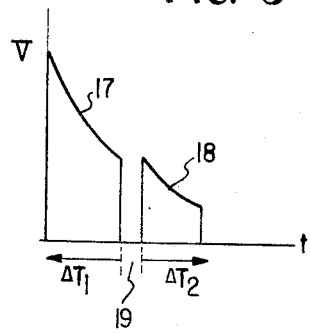
FIG. 5
FIG. 6
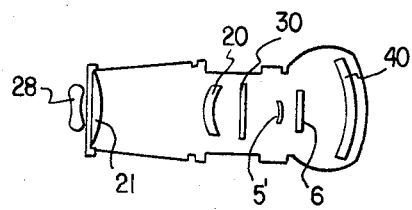
INVENTOR.
MATAICHI TAJIMA
BY *Sughrue, Rothwell, Mion, Zinn, & Macpeak*
ATTORNEYS

United States Patent Office 3,510,650
Patented May 5, 1970

3,510,650
APPARATUS FOR PRODUCING COLORED RADIOGRAPHS
Mataichi Tajima, Kanagawa, Japan, assignor to Fuji Shashin Film Kabushiki Kaisha, Kanagawa, Japan
Filed Nov. 4, 1965, Ser. No. 506,358
Claims priority, application Japan, Nov. 5, 1964, 39/62,437
Int. Cl. G01n 21/34
U.S. Cl. 250—65                                       3 Claims

ABSTRACT OF THE DISCLOSURE

An apparatus for irradiating an object directly by a plurality of X-rays of different wavelengths without attenuation to produce successive images on a fluorescent screen disposed behind the object. An optical system is provided to form the images from the fluorescent screen on to color photosensitive material. A plurality of color filters are inserted in the light path of the image in synchronization with X-rays of different wavelength, respectively, to produce separate color images on separate photosensitive layers of said color photosensitive material.

---

The present invention relates to a process for producing a colored photograph by radiations, more particularly to a process for producing a colored photograph in which a transparent image of an object obtained by generating X-rays having different wave lengths, wave forms of voltage or current of the tube, or dosages is expressed as an image consisting of different colors and the image is recorded on a photographic sensitive material.

The following are drawbacks in the case of using radiographs comprising black and white images.

(1) The density range of a produced image is limited by the combination of the brightness of an illumination box (Schaukasten) and a sense of sight. (Limit in range of photographic density.)

(2) It is required to put the photographic gradation in an optimum range, that is, a suitable photographic density of the radiative dosage must be higher than the threshold value in order to inspect the details of an object. (Limit in photographic gradient.)

(3) If the photographic gradient is increased too much, the numerous points in the object can hardly be reproduced and discriminated in the photograph. (Limit in exposure latitude.)

As mentioned above, in black and white X-ray photography, strict restrictions are required about the characteristics of photographic films, the accelerating voltage of a radiative plant, the radiative dosage, the photographic development, and the like caused by the limitations with respect to the three characteristics of (1) photographic density, (2) photographic gradient, and (3) exposure latitude. For example, as to the chest of a human body, it is impossible to reproduce on one radiograph the coe and the pulmo simultaneously. However, if they are reproduced as color images of two or more colors, the range of portions which can be discriminated on one radiograph will be enlarged remarkably. For this purpose many studies have been made but in all of these proposed or published methods, a radiation such as X-rays is directly radiated onto a conventional color film or a color film is irradiated between two fluorescent screens having different fluorescent colors, without or with the use of intensifying screens.

According to the process of the present invention, the transparent image of an object for each voltage is reproduced as a color image having a different color. By using radiations of two or more different wave lengths each color image is superimposed on a light-sensitive material.

The invention will be explained further in detail referring to accompanying drawings, in which FIG. 1 is a schematic view showing an example of a device for the fluorescent radiograph having the mechanisms for making colored photography suitable for use in the process of this invention, FIG. 2, FIG. 3, and FIG. 4 are schematic views each showing an example of a color filter group for use with an optical lens.

FIG. 5 is a graph showing a wave form by a high tension supply system applied with wave tail cutting of the tube voltage, and FIG. 6 is a schematic view showing an example in which the invention is applied to an Odelca camera or a mirror camera.

Referring now to FIG. 1, a fluorescent radiographic apparatus having a photographing apparatus necessary for carrying out the process of this invention is shown. That is, in FIG. 1, a radiation 1 generated by a below-mentioned method radiates through an object 2 to be detected on a fluorescent screen 3, whereby the silhouette of the object 2 is formed on the fluorescent screen 3 as a fluorescent image. The fluorescent image on the fluorescent screen is then focused on a photographic sensitive film 5 through a camera lens 4.

The above-mentioned system is the same as that in conventionally used black and white fluorescent radiography but in the process of this invention, a fluorescent screen having a specific composition is used and further a color filter group 6 of two or more colors is inserted directly in front of the camera lens 4. From the color filter group, each color filter is placed sequentially in the light flux in the lens system by means of a filter translating mechanism 7, 7' consisting of linear solenoids or rotary solenoids.

In FIG. 2, FIG. 3, and FIG. 4 are shown in detail these filter groups. In FIG. 2, a plunger 8 mounting filters 9 and 10 having different colors can be moved in the direction perpendicular to the direction of light flux. The color filter group is so arranged that a desired color filter 9 or 10 (color filter 9 in the case of FIG. 2) is conveyed to a position in front of lens 4 and stays there for the necessary radiation time. In FIG. 3 is shown a color filter group having three color filters 11, 12, and 13 and the filters are moved by the same manner as in FIG. 2. In FIG. 4 is shown another type of color filter group having filters 15 and 16 which can be moved by means of a rotary solenoid 14.

The graph in FIG. 5 shows the relation of time and tube voltage in a high tension supply system by wave tail cutting of tube voltage. For example, the wave form 17 by 120 kv. and the wave form 18 by 50 kv. are generated sequentially with a short time interval 19.

Now, the principle of the formation of color images by the process of this invention will be explained referring to FIG. 1, FIG. 2, and FIG. 5. For example, the color filters 9 and 10 in FIG. 2 are selected green and red respectively and the fluorescent screen 3 in FIG. 1 is so selected that the fluorescent color from the fluorescent screen is the color of light in the approximate range of 500–650 m$\mu$. At the same time, a color film having a color sensitivity in this region is mounted as the light-sensitive material 5 in FIG. 1. The color photographic film is suitably a subtractive multi-layer color photographic film which generates a magenta color when sensitized with green light and generates a cyan color when sensitized with red light. Moreover, a process wherein a colored image of green and red is obtained by sensitizing with green light and red light a reversal color film can be used.

Now, when a X-ray of 120 kv. is generated from an

X-ray generator and radiated for a period of $\Delta T_1$ in FIG. 5, the green filter of color filter group 6 is positioned on the optical axis. Then, during the very short time-interval of radiation interruption as shown in FIG. 5, the green filter in the color filter group 6 is replaced with the rod filter in the same color filter group in FIG. 2. Thereafter, at the position of the color filter, an X-ray of 50 kv. is radiated for a period a $\Delta T_2$ in FIG. 5. Thus, on the color film 5 are superimposed a green image (120 kv.) and a red image (50 kv.) and a magenta color and a cyan color are formed in each case. As a result, a part of an object to be detected having a comparatively low radiation transmittance is reproduced as a green image, a part having a comparatively high radiation transmittance is reproduced as a red image, and a mixed part thereof is reproduced as a yellow image by the principle of the additive color system.

In the above-mentioned principle and mechanism, there are close relations between the luminous color of a fluorescent screen, the spectral transmittance of a color filter, and the sensitivity of a photographic sensitive material and specific spectral conditions by a suitable combination thereof is necessary. At the same time, in the system, a color film of two or more colors is used. Moreover, in the case of reproducing radiation color photography as a moving film, it is preferable to make the color filter group exchangeable by rotating the filter group.

As the X-ray generator, any one of the following systems may be used if it can generate sequentially more than two tube voltages.

(1) Transformer system
    (1.1) Self rectification
    (1.2) Half-wave rectification
    (1.3) Full-wave rectification
(2) Condenser system
    (2.1) High tension supply system
    (2.2) Filament supply system.

In addition to providing at least two X-rays having different wavelengths by means of generating X-rays with one X-ray tube and a plurality of successive voltages, it is possible to provide at least two X-rays having different wavelengths by generating X-rays by the sequential operation of a plurality of X-ray tubes, each at a different voltage.

EXAMPLE 1

The system of the example is shown in FIG. 6, in which is shown a conventional mirror camera or an Odelca camera having an adaptable lens 20, a cylindrical lens 30, and a spherical mirror 40 and the camera is utilized in the process of this invention as follows. That is, a fluorescent screen of the conventional camera is replaced with the fluorescent screen 21 in this invention, a color filter group 6 is inserted at any position in the optical axis, and a two-, three-, and four-layer color photographic film 5 is mounted as a photographic sensitive material. As in the above-mentioned principle, a colored radiograph of an object 28 to be detected can be obtained by radiating X-rays.

EXAMPLE 2

In FIG. 2, and FIGS. 4–6, are shown the examples in which 2-color or 3-color type color film is used and 2-color filters are used successively. In this example, by using three wave forms instead of the two wave forms in FIG. 5 and 3-color filters (FIG. 3) are used instead of the two-colored filters in FIG. 2 and FIG. 4, a color image of three colors can be obtained. Furthermore, a color film having four or more colors can be similarly used.

EXAMPLE 3

In FIG. 5 are shown wave forms 1 and 2 of different tube voltages but when they are generated as wave forms having different radiation intensities, the details of a broad range in an object can be reproduced on a photographic light-sensitive material by the difference of dosages.

What I claim is:

1. Apparatus for producing a colored radiograph comprising radiation means adapted to produce a plurality of X-rays sequentially each of which has a different wavelength, means for supporting an object to be irradiated by said X-rays without substantial attenuation, light-emitting fluorescent screen means adapted to produce successive and different color images of said object which is exposed to said X-rays in sequence, filter means comprising a plurality of color filters adapted to be sequentially aligned with each of said different color images, respectively, photographic means for recording in color said images after said images are passed through said filter means, said radiation means, said support means, said screen means, said filter means and said photographic means, all being in optical alignment.

2. The apparatus according to claim 1 further comprising means for shifting said filter means such that a different filter will be optically aligned with the radiation source for each of said different wave-lengths.

3. The apparatus according to claim 2 wherein said means for moving said filter means are solenoid means.

References Cited

UNITED STATES PATENTS

| | | | |
|---|---|---|---|
| 2,434,019 | 1/1948 | Switzer et al. | 250—65 X |
| 2,644,096 | 6/1953 | Fine | 250—65 |
| 3,229,089 | 1/1966 | Sasao | 250—65 |

WILLIAM F. LINDQUIST, Primary Examiner